US011892561B2

United States Patent
Miller et al.

(10) Patent No.: US 11,892,561 B2
(45) Date of Patent: Feb. 6, 2024

(54) ANTENNA ICE LOADING SENSOR AND METHOD

(71) Applicant: Nanowave Technologies Inc., Etobicoke (CA)

(72) Inventors: Justin Dinsdale Miller, Etobicoke (CA); Charles William Tremlett Nicholls, Nepean (CA)

(73) Assignee: Nanowave Technologies Inc., Etobicoke (CA)

( * ) Notice: Subject to any disclaimer, the term of this patent is extended or adjusted under 35 U.S.C. 154(b) by 187 days.

(21) Appl. No.: 17/633,830

(22) PCT Filed: Aug. 10, 2020

(86) PCT No.: PCT/CA2020/051096
§ 371 (c)(1),
(2) Date: Feb. 8, 2022

(87) PCT Pub. No.: WO2021/022385
PCT Pub. Date: Feb. 11, 2021

(65) Prior Publication Data
US 2022/0317244 A1     Oct. 6, 2022

Related U.S. Application Data

(60) Provisional application No. 62/884,398, filed on Aug. 8, 2019.

(51) Int. Cl.
*G01S 7/40*     (2006.01)
*G01B 15/02*     (2006.01)
*H01Q 13/20*     (2006.01)

(52) U.S. Cl.
CPC .......... *G01S 7/4039* (2021.05); *G01B 15/025* (2013.01); *H01Q 13/20* (2013.01)

(58) Field of Classification Search
CPC ...... G01S 7/4039; G01B 15/025; H01Q 13/20
See application file for complete search history.

(56) References Cited

U.S. PATENT DOCUMENTS 5,381,694 A     1/1995  Glynn et al.
5,485,159 A     1/1996  Zhang et al.
(Continued)

OTHER PUBLICATIONS

International Patent Application No. PCT/CA2020/051 096, International Search Report and Written Opinion dated Nov. 13, 2020.
(Continued)

*Primary Examiner* — Bernarr E Gregory
*Assistant Examiner* — Kenneth W Good
(74) *Attorney, Agent, or Firm* — Borden Ladner Gervais (57) ABSTRACT

Disclosed herein is a system and method for determining a thickness of ice on Radio Frequency (RF) systems The system includes a sensor unit for use in determining the thickness of ice on a surface of a RADAR system having a RADAR antenna, the sensor unit including a sensor unit antenna tunable to a harmonic of a RADAR antenna signal, the harmonic having a frequency within an ice absorption band, wherein the sensor unit antenna emits the harmonic at a first signal strength; and, a sensor unit receiver communicatively coupled to the sensor unit antenna and configured to detect a second signal strength of the harmonic received by the sensor unit antenna.

20 Claims, 5 Drawing Sheets

(56) References Cited

U.S. PATENT DOCUMENTS

| | | | |
|---|---|---|---|
| 6,166,661 | A | 12/2000 | Anderson et al. |
| 6,348,889 | B1 * | 2/2002 | Ashihara ............... G01S 7/4004 |
| | | | 342/85 |
| 6,686,872 | B2 | 2/2004 | Vacanti |
| 2003/0169198 | A1 | 9/2003 | Hofmann et al. |
| 2020/0018293 | A1 * | 1/2020 | Taillade ................. F03D 80/40 |

OTHER PUBLICATIONS

International Patent Application No. PCT/CA2020/051096, International Preliminary Report on Patentability dated Feb. 8, 2022.
European Patent Application No. EP20850010.8, Extended European Search Report dated Jul. 7, 2023.

* cited by examiner

ANTENNA ICE LOADING SENSOR AND METHOD

CROSS-REFERENCE

This application claims the benefit of priority of U.S. Provisional Patent Application No. 62/884,398 filed Aug. 8, 2019, and PCT Patent Application No. CA2020/051096 filed Aug. 10, 2020, which are hereby incorporated by reference.

FIELD

The present disclosure relates to RADAR (Radio Detection and Ranging) systems, including but not limited to RADAR systems and sensors operating in inclement weather conditions.

BACKGROUND

RADAR systems use radio waves to detect objects and determine object parameters such as range, angle or velocity. RADAR systems have broad ranges of use, from surveillance and navigation, to weather and meteorological monitoring, and a variety of military applications.

RADAR systems may be employed in a diverse range of environments, including in conditions below freezing. In such below-freezing conditions, ice and other particulate may amass on an exterior of the RADAR system, such as may be experienced in coastal RADAR deployments. The formation of ice on an exterior of a RADAR system may cause operational degradation of the RADAR system including but not limited to radio wave attenuation and corresponding degradation of system sensitivity, physical damage to antenna structure, and other detrimental effects that may degrade system performance or possibly damage the RADAR system permanently.

Improvements in RADAR systems operating in inclement weather conditions are desirable.

BRIEF DESCRIPTION OF THE DRAWINGS

Embodiments of the present disclosure will now be described, by way of example only, with reference to the attached Figures.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompassed by the corresponding description.

BRIEF SUMMARY

The following presents a simplified summary of the disclosure in order to provide a basic understanding of some aspects of the disclosure. It is not intended to identify key or critical elements of the embodiments or to delineate the scope of the embodiments. The following summary merely presents some concepts of the disclosure in a simplified form as a prelude to the more detailed description provided below.

In a first aspect, the present disclosure provides a sensor unit that can be used to determine a thickness of ice on a surface of a RADAR system having a RADAR antenna. The sensor unit comprises a sensor unit antenna, tunable to a harmonic of a RADAR antenna signal, the harmonic having a frequency within an ice absorption band. The sensor unit further comprises a sensor unit receiver communicatively coupled to the sensor antenna and configured to detect a signal strength of the harmonic received by the sensor antenna. In an embodiment, the sensor unit antenna emits the harmonic at a first signal strength, and the sensor unit receiver detects a second signal strength of the harmonic received by the sensor unit antenna. In an embodiment, the sensor unit outputs a baseband signal indicative of a thickness of ice. In an embodiment, the baseband signal is proportional to a signal attenuation based on the first signal strength of the harmonic and the second signal strength of the harmonic. In an embodiment, the sensor unit determines the thickness of the ice based on the signal strength of the harmonic received by the sensor unit antenna and an attenuation rate of the of the ice absorption band for the frequency of the harmonic.

In an embodiment, the sensor unit receiver is configured to generate a baseband signal based on the signal strength of the received harmonic.

In an embodiment, the sensor unit receiver is configured to generate a baseband signal proportional to the second signal strength of the harmonic.

In an embodiment, the sensor unit receiver is configured to determine an attenuation of the harmonic based on the signal strengths of the harmonic emitted, and received, by the sensor unit antenna, and an attenuation rate of the ice absorption band, for generating a baseband signal proportional to the thickness of the ice.

In an embodiment, the sensor unit receiver is configured to determine a signal attenuation based on the first signal strength of the harmonic and the second signal strength of the harmonic, for generating a baseband signal proportional to the signal attenuation. In an embodiment, the sensor unit receiver generates the baseband signal based on the signal attenuation and an attenuation rate of the ice absorption band. In an embodiment, the attenuation rate of the ice absorption band is based on the frequency of the harmonic.

In an embodiment, the sensor unit receiver determines the thickness of ice based on comparing the baseband signal to pre-calibrated signal thresholds indicative of the thickness of ice.

In an embodiment, the sensor unit antenna is a parasitic antenna.

In an embodiment, the sensor unit antenna is a parasitic array of patch antennas.

In an embodiment, the sensor unit antenna is tuned to the harmonic falling within the ice absorption band between about 20 GHz and about 30 GHz.

In an embodiment, the sensor unit antenna is mountable to at least one of an interior side of a surface of the RADAR system or an interior side of the surface of the RADAR system. In an embodiment, the surface of the RADAR system is exposed to ice accumulation.

In a second aspect, the present disclosure provides a RADAR system that comprises a radome and a waveguide antenna housed in the radome and configured to operate at an RF frequency. The RADAR system further comprises a sensor unit antenna array mounted to a surface of the radome exposed to ice accumulation. The sensor unit antenna array is tunable to a harmonic of the RF frequency within an ice absorption band. The RADAR system further comprises a sensor unit receiver housed in the radome and communicatively coupled to the sensor unit antenna array. The sensor unit receiver is configured to detect a signal strength of the harmonic received by the sensor unit antenna array. In an embodiment, the sensor unit antenna array emits the harmonic at a first signal strength, and the sensor unit receiver detects a second signal strength of the harmonic received by the sensor unit antenna array. In an embodiment, the sensor unit receiver outputs a baseband signal indicative of a thickness of ice. In an embodiment, the baseband signal is proportional to a signal attenuation based on the first signal strength of the harmonic and the second signal strength of the harmonic. In an embodiment, the baseband signal is based on the signal attenuation and an attenuation rate of the ice absorption band. In an embodiment, the attenuation rate for the ice absorption band is based on the frequency of the harmonic. In an embodiment, the ice absorption band is between about 20 GHz and about 30 GHz.

In an embodiment, the waveguide antenna is a linear waveguide antenna operating in an X-band frequency range. In an embodiment, the RF frequency is between about 9 GHz and about 9.5 GHz. In an embodiment, the sensor unit antenna array is a parasitic array of patch antennas. In an embodiment, the harmonic is a third harmonic of the RF frequency, wherein the third harmonic falls within about 27 GHz and about 28.5 GHz. In an embodiment, the sensor unit receiver is a Ka band receiver configured to detect signals in a Ka band between about 26.5 GHz and about 40 GHz. In an embodiment, the sensor unit receiver is configured to detect signals between about 27 GHz and about 28.5 GHz.

In an embodiment, the sensor unit antenna array is oriented orthogonal to the waveguide antenna.

In a third aspect, the present disclosure provides a method of determining a thickness of ice accumulated on a surface of a RADAR using a sensor unit coupled to the RADAR system. The method comprises: tuning a sensor unit antenna to a harmonic of a signal transmitted by the RADAR system, the harmonic falling within an ice absorption band; emitting the harmonic, from the sensor unit antenna, through the ice, at a first signal strength; detecting, using a sensor unit receiver communicatively coupled to the sensor unit antenna, a second signal strength of the harmonic received by the sensor unit antenna; determining, using the sensor unit receiver, an attenuation of the harmonic based on the first signal strength of the harmonic and the second signal strength of the harmonic; and, determining a thickness of the ice based on the attenuation of the harmonic and an attenuation rate of the ice absorption band. In an embodiment, the method further includes a step of outputting a baseband signal proportional to the determined thickness of the ice.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meaning as used in this context are set forth below. To the extent a term used herein is not defined below, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

Disclosed herein is an ice loading sensor unit for detecting a thickness of ice, and more particularly for detecting a thickness of ice that may accumulate on an exterior of a surface of a RADAR system, such as an exterior of an antenna radome. In an embodiment, the sensor unit is a standalone system which may be retrofitted into existing antenna systems, such as RADAR systems. In another embodiment, the sensor unit is designed into, or integrated with, customized platforms such that the sensor unit is provided as part of an antenna system or a RADAR system. The sensor unit, and for example an output thereof, may be used to facilitate corrective action and mitigate effects of ice accumulating on surfaces, which may occur in inclement weather conditions, such as in coastal deployments or other environments subject to sub-zero temperatures. For example, knowledge of a thickness of ice based on a sensor unit output may be exploited to take corrective action, such as by maintaining a RADAR system in operation by electrically compensating for degraded performance. Other corrective actions may include temporarily shutting down the RADAR system and/or signalling for removal of ice from the exterior of the system. In an embodiment, the sensor unit output is a baseband signal proportional to a thickness of ice detected by the sensor unit. In an embodiment, the baseband signal is provided on a display communicatively couples to the sensor unit receiver. In an embodiment, the baseband signal is converted to a unit of measure indicative of the thickness of ice.

The ice loading sensor unit may be retrofitted into existing RADAR systems by mounting a sensor unit antenna to an exterior or an interior of a surface that may accumulate ice or otherwise become loaded with ice. Embodiments of a RADAR system retrofitted with an ice loading sensor unit include a sensor unit antenna positioned near or proximal a surface which may accumulate ice. In an embodiment, a method for retrofitting an existing RADAR system includes a step of mounting a sensor unit antenna near or proximal a surface which may accumulate ice. The sensor unit includes a sensor unit antenna and a sensor unit receiver communicatively coupled to the sensor unit antenna. The sensor unit antenna is tunable to a harmonic, of the transmitted RADAR signal, falling within an ice absorption band. The sensor unit receiver is configured to detect a signal strength of the harmonic received by the sensor unit antenna. The signal strength of the harmonic received by the sensor unit antenna may be used to determine a measure of signal attenuation resulting from ice absorbing signal energy. In an embodiment, signal attenuation is determined by comparing the return harmonic signal strength against an unloaded signal strength. In an embodiment, the unloaded signal strength is a stored value that was measured when the underlying RADAR system was in an unloaded state, having no accumulation of ice. As such, knowledge of attenuation rates associated with the ice absorption band may be exploited to determine a thickness of ice based on calculating a measure of signal attenuation as may be determined from the signal strength of the harmonic received by the sensor unit antenna.

The sensor unit antenna is tunable for transmitting a harmonic in an ice absorption band. One such ice absorption band is the Radio Frequency (RF) band from about 20 GHz to about 30 GHz. As further discussed herein with reference to FIG. 4, this particular band has higher rates of spectral absorption in water than other RF bands at comparable frequencies, resulting in greater rates of signal attenuation, thus making the 20-30 GHz band suitable for determining a thickness of ice. Accordingly, a sensor unit antenna may be tuned for example, to the third harmonic of a 9 GHz signal, for transmitting a harmonic at 27 GHz, falling within the 20-30 GHz ice absorption band. Other signal frequencies may require tuning the sensor unit antenna to different harmonics as may be necessary to fall within an ice absorption band. For example, a 5.5 GHz signal requires tuning the sensor unit antenna to the fourth or fifth harmonic to fall within the 20-30 GHz ice absorption band. Other embodiments may also leverage different RF bands having different associated rates of spectral absorption in ice.

Figure 1:
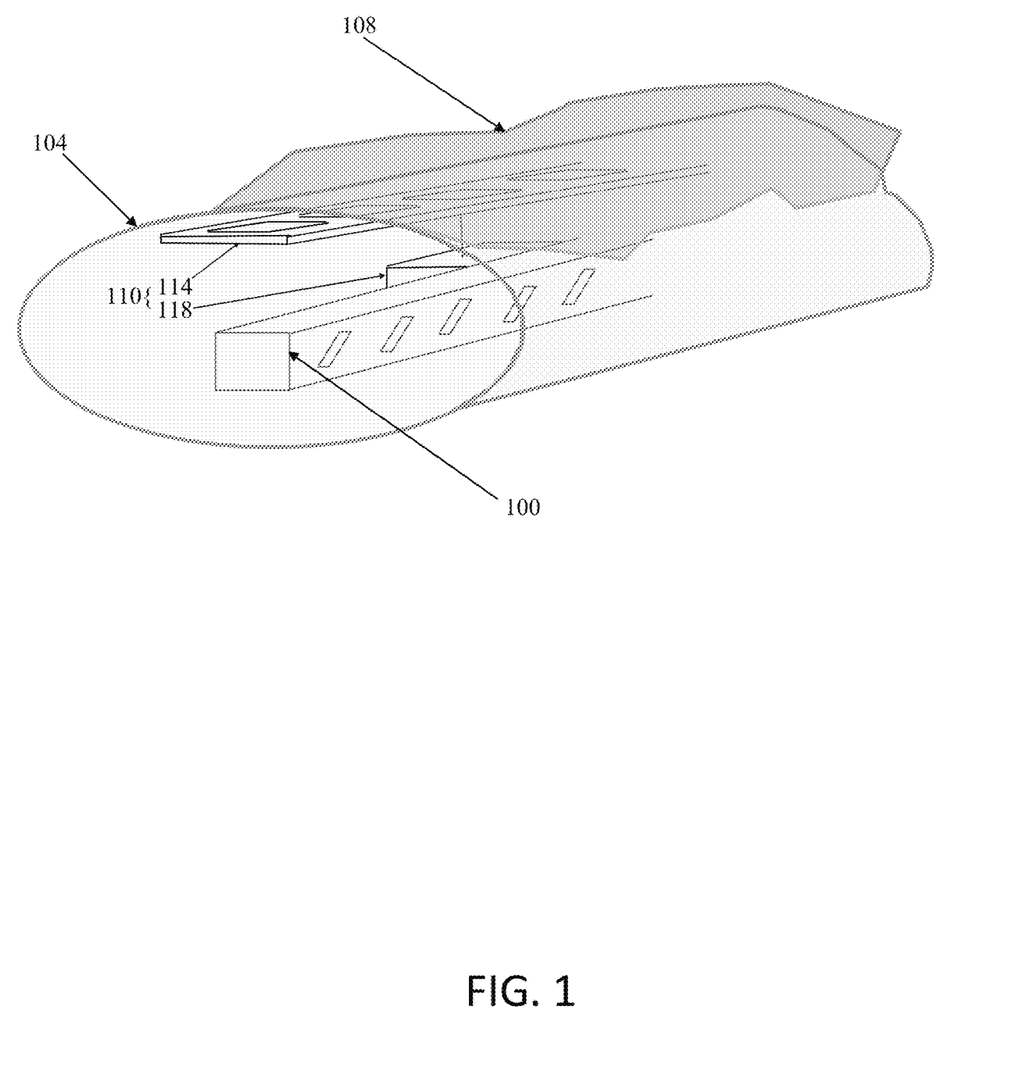
FIG. 1 is a partial perspective view of a RADAR antenna system retrofitted with an ice loading sensor unit according to an embodiment herein.
Figure 2:
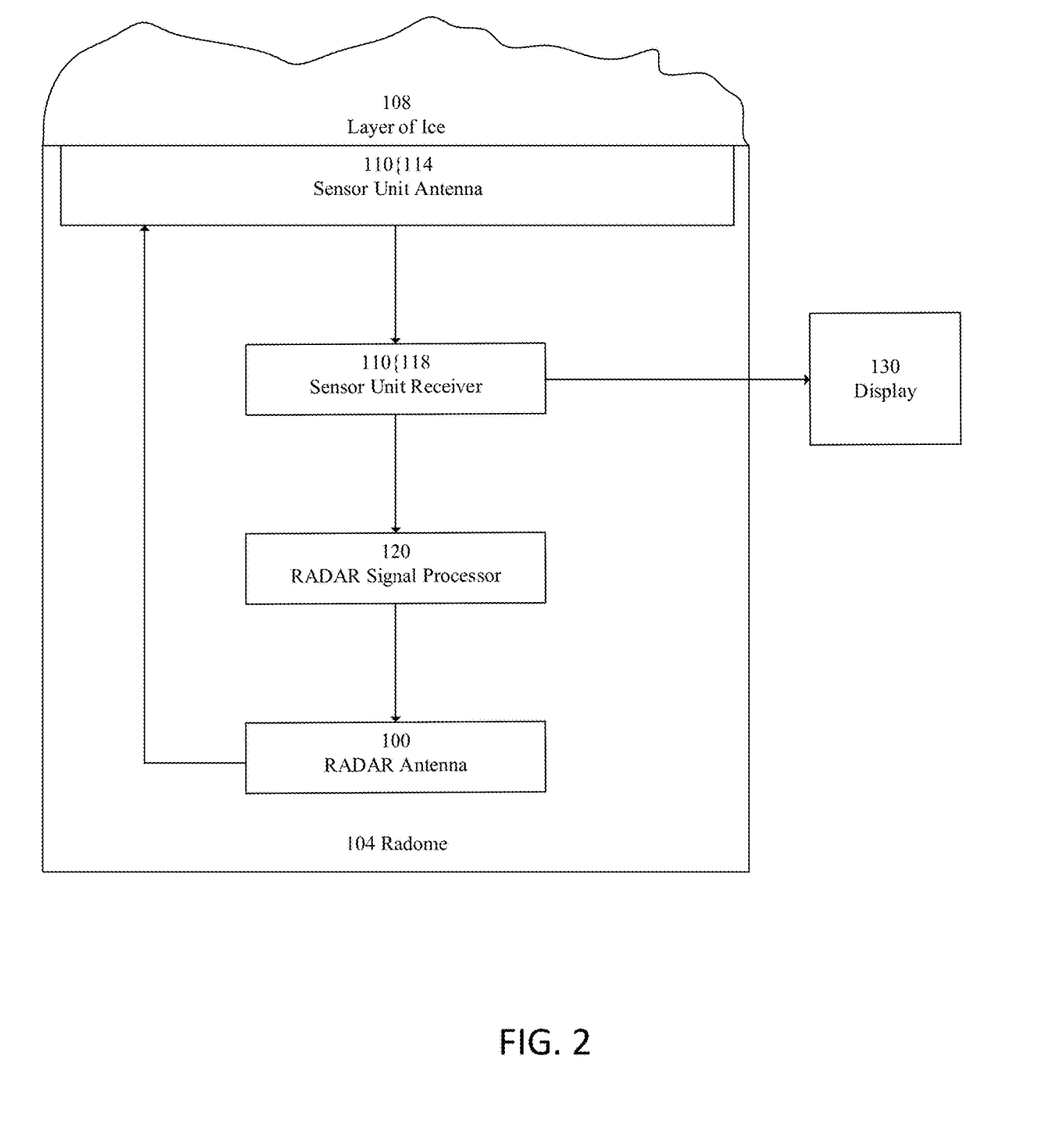
FIG. 2 is a block diagram of the RADAR antenna system illustrated in FIG. 1.
Figure 3:
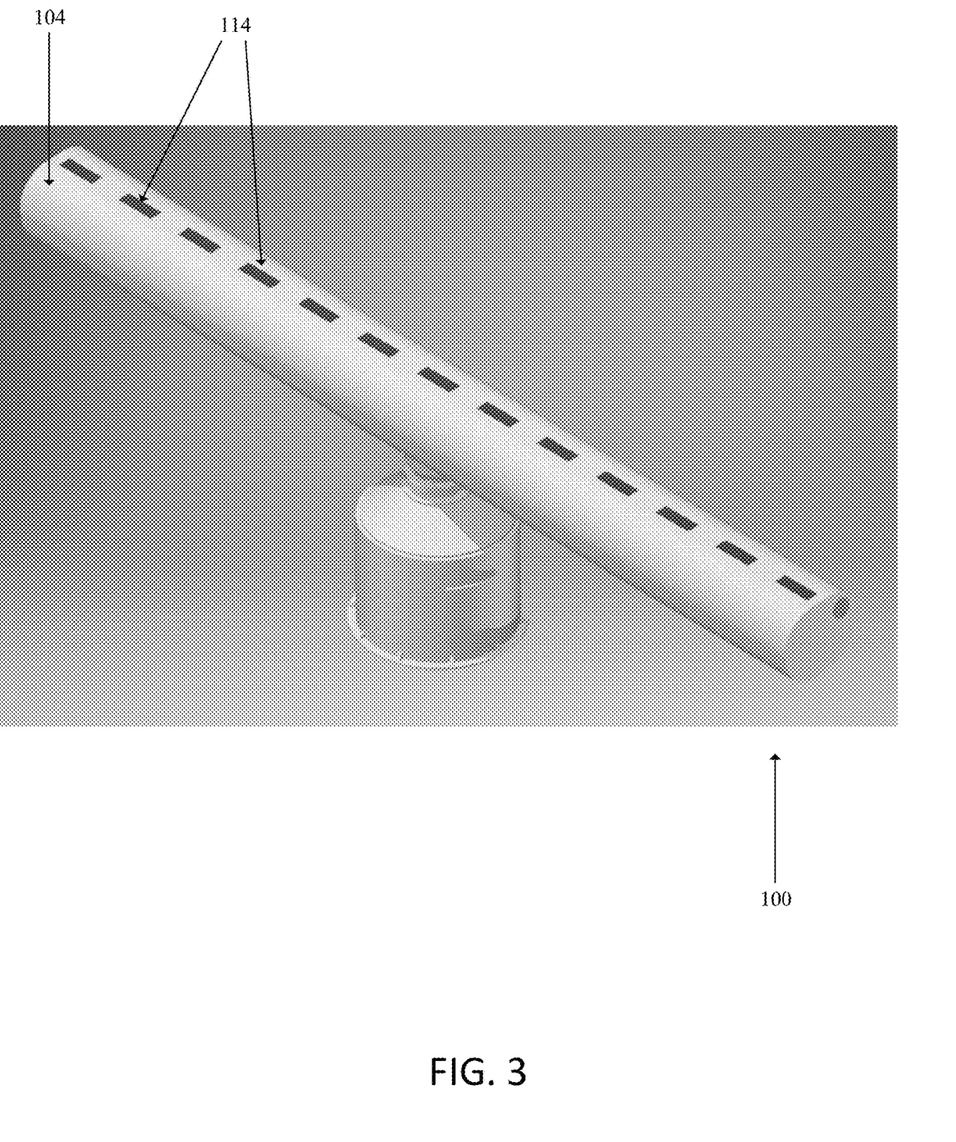
FIG. 3 is a perspective view of a linear antenna array RADAR antenna system having a sensor unit antenna mounted to an exterior of an antenna radome.

FIGS. 1-4 are illustrative embodiments of a RADAR system retrofitted with an ice loading sensor unit according to an embodiment herein. FIG. 1 illustrates a RADAR system including a RADAR antenna 100 housed within an antenna radome 104 wherein an ice layer 108 has accumulated on an exterior surface of the antenna radome 104. The RADAR system is retrofitted with an ice loading sensor unit 110 for detecting a thickness of the ice layer 108. The ice loading sensor unit 110 comprises a sensor unit antenna 114 and a sensor unit receiver 118. The sensor unit antenna 114 is mounted to an interior of a top surface of the antenna radome 104 proximal to the ice layer 108; however, as illustrated in FIG. 3, the sensor unit antenna 114 may be mounted to an exterior of a top surface of the antenna radome 104. FIG. 2 illustrates a block diagram corresponding to FIG. 1. The sensor unit receiver 118 communicates with the RADAR signal processor 120, which further controls the RADAR antenna 100. The sensor unit receiver 118 also communicates with a display 130, which may be provided at a location remote from the radome 104 to allow for visual monitoring. In an embodiment, the sensor unit receiver 118 outputs a baseband signal to the RADAR signal processor 120 and the display 130, wherein the baseband signal is indicative of a thickness of the layer of ice 108. In an embodiment, the RADAR signal processor modifies a power level of the RADAR antenna 100 in response to the baseband signal, to compensate for signal degradation resulting from the layer of ice 108.

In an embodiment, the RADAR antenna 100 is a linear waveguide antenna operating in an X-band, in particular operating between about 9 GHz and about 9.5 GHz. In an embodiment, the sensor unit antenna 114 is orthogonally oriented relative to the RADAR antenna 100 to minimize or otherwise prevent saturation of the sensor unit receiver 118 under transmission. In an embodiment, the sensor unit antenna 114 is oriented 90° relative to the RADAR antenna 100, to minimize or otherwise prevent saturation of the sensor unit receiver 118 under transmission. In an embodiment, the sensor unit antenna 114 is a sensor antenna array comprising a plurality of parasitic patch antennas tuned to a harmonic of RADAR antenna 100, falling within an ice absorption band. In an embodiment where the RADAR antenna 100 is operating in an X-band between about 9 GHz and about 9.5 GHz, the sensor unit antenna 114 can be tuned to a third harmonic of the RADAR antenna 100, the third harmonic thereby falling within the ice absorption band between about 20 GHz and about 30 GHz.

The sensor unit receiver 118 is communicatively coupled to the sensor unit antenna 114 and housed within an interior of the antenna radome 104. In an embodiment, the sensor unit receiver 118 is a Ka band receiver, for receiving and detecting signals in a Ka band between about 26.5 GHz and about 40 GHz. In an embodiment, the sensor unit receiver 118 is tuned for receiving and detecting signals between about 27 GHz and about 28.5 GHz. Knowledge of attenuation rates of signals transmitting through ice between about 27 GHz and about 28.5 GHz may be leveraged to determine a thickness of ice layer 108. As depicted in the absorption spectrum graph illustrated in FIG. 5, for example, water attenuates signals transmitting between about 27 GHz and about 28.5 GHz at an approximate rate of 0.1 dB/km. Accordingly, a signal strength of a harmonic detected by the sensor unit receiver 118 may be used along with known attenuation rates of ice to determine a thickness of ice layer 108.

Figure 4:
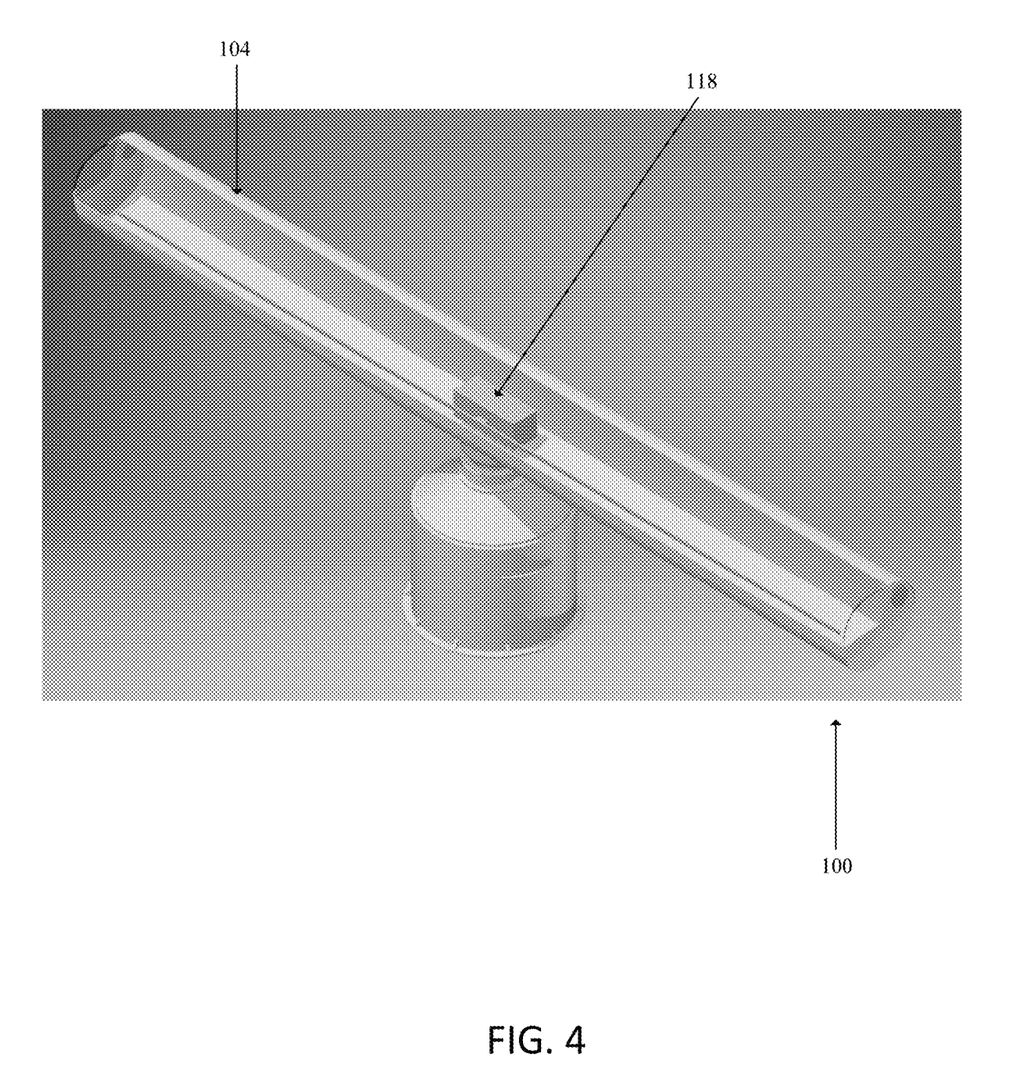
FIG. 4 is an interior perspective view of a linear antenna array RADAR system according to FIG. 3 having a sensor unit receiver housed inside the antenna radome.

FIGS. 3 and 4 are perspective views a RADAR system similar to FIG. 1. In particular, FIG. 3 is an embodiment of a RADAR system retrofitted with a sensor unit antenna 114 comprising an array of parasitic patch antennas mounted to an exterior of the antenna radome 104, for detecting a thickness of a layer of ice thereabout. FIG. 4 is an interior view of FIG. 3, further illustrating a sensor unit receiver 118 housed within the antenna radome 104. The RADAR antenna 100 as illustrated in FIGS. 3 and 4 is a rotating linear antenna array having a size of up to 21 feet in length and which may be deployed in coastal environments subject to sub-zero temperatures.

Figure 5:
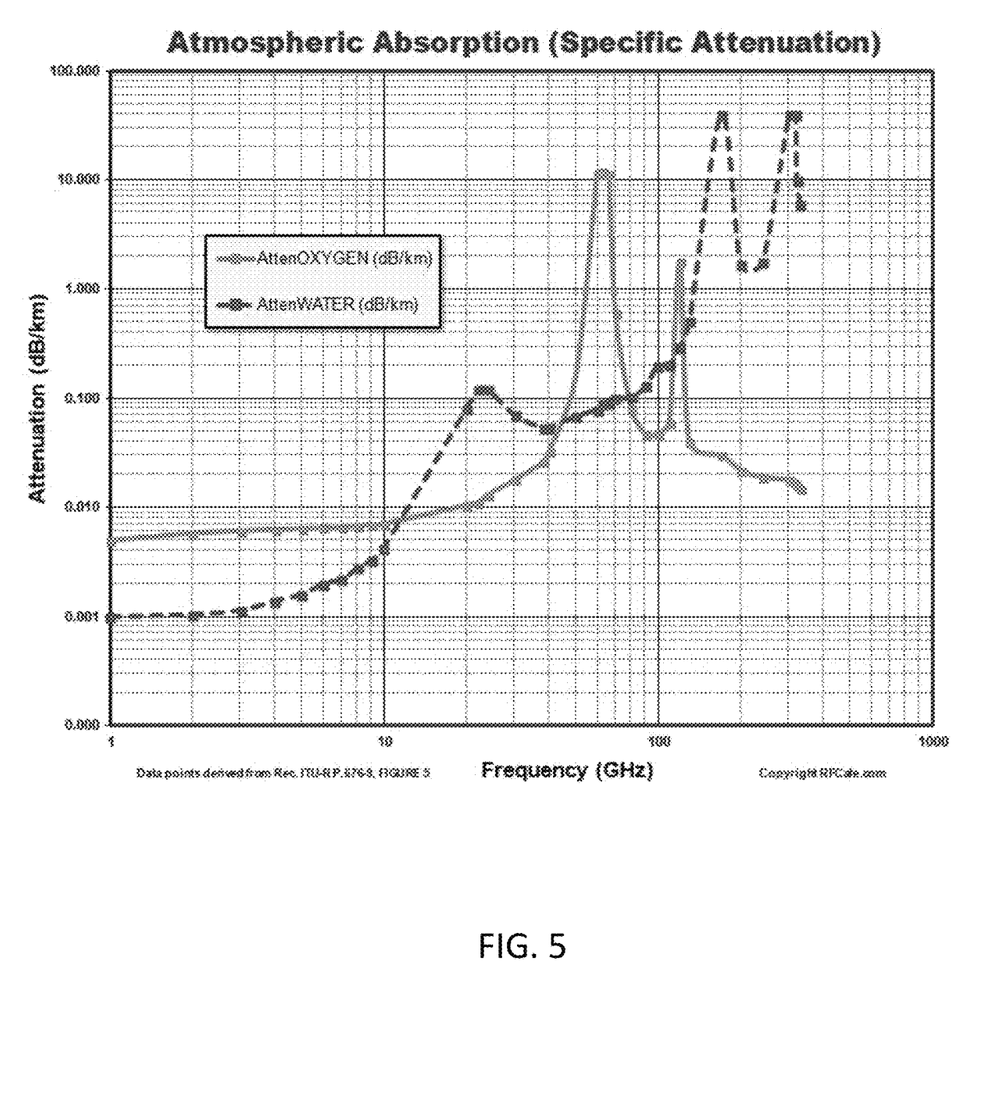
FIG. 5 is a graph illustrating the absorption spectrum for water and oxygen across frequencies ranging from 1 GHz to 1000 GHz.

FIG. 5 is a graph illustrating an absorption spectrum for oxygen and water across frequencies ranging from 1 GHz to 1000 GHz, as charted along the X-axis. Attenuation rates are measured in units of dB/km and charted along the Y-axis and are indicative of the degree to which signals will attenuate when transmitting at a particular frequency through either medium. An ice absorption band between about 20 GHz and 30 GHz is suitable for determining a thickness of ice as spectral absorption in this band is indicative of water absorption rather than oxygen absorption, thereby making for unambiguous detection of a thickness of ice. While operating an ice loading sensor unit as disclosed herein within such an ice absorption band is preferable, those skilled in the art will appreciate that the principles and practices as described herein may be scaled to other frequencies and absorption bands to determine a thickness of a layer of ice which may accumulate on a surface of a RADAR system or other RF systems.

Embodiments of a sensor unit antenna as disclosed herein include a parasitic antenna. A parasitic antenna is understood by those skilled in the art to encompass a passive radiation element which responds to a radiation pattern of another antenna. For example, a parasitic antenna may couple to a RADAR antenna for tuning to a harmonic of a RADAR antenna transmission signal. As such, a parasitic antenna advantageously enables ease of retrofitting the ice loading sensor unit to existing systems as the parasitic antenna need only be selectively tuned to a desired harmonic of the underlying system to generate a signal harmonic in an ice absorption band. In an embodiment, the ice loading sensor unit includes a single parasitic antenna. In an embodiment, the ice loading sensor unit includes a plurality of parasitic antennas. In an embodiment, the ice loading sensor unit includes a parasitic array of patch antennas. Patch antennas advantageously have a low vertical profile and flat surface form factor for ease of mounting to a surface of an existing RADAR system.

In an embodiment, the sensor unit antenna is mountable to at least one of an interior or an exterior of a surface of a RADAR system, such as an antenna radome. In an embodiment the sensor unit antenna is dimensioned to span a surface of a RADAR system. In an embodiment, the sensor unit antenna is sized and shaped to cover a top surface of an antenna radome. Mounting antennas across an antenna radome advantageously provides greater system redundancy and greater precision in detecting unequal ice accumulation across the antenna radome.

A sensor unit receiver as disclosed herein is communicatively coupled to the sensor unit antenna. The sensor unit receiver detects a signal strength of a harmonic received by the sensor unit antenna wherein the sensor unit antenna is tuned to a harmonic of the transmitted RADAR signal. Embodiments of a sensor unit antenna include an antenna tuned to a harmonic falling within an ice absorption band, such as a harmonic falling within an ice absorption band between about 20 GHz and about 30 GHz. In an embodiment, the sensor unit receiver is a Ka band receiver configured to detect the signal strength of harmonics in a Ka band between about 26.5 GHz and about 40 GHz. The detected signal strength may be exploited to calculate a thickness of ice based on attenuation rates associated with signals transmitting through ice at particular frequencies.

For example, the sensor unit antenna may be tuned to receive a harmonic having transmitted through ice at 27 GHz. The sensor unit receiver further detects a signal strength of the received harmonic. The signal strength of the received harmonic may be used to determine a thickness of ice based on a spectral absorption rate of signals transmitting through ice at 27 GHz. For example, such a calculation can be based on the fact that the amount of spectral absorption or signal attenuation resulting from the ice will be directly proportional to the thickness of the ice and the corresponding attenuation rate of the ice. The sensor unit receiver is preferably housed in a protective enclosure such as an antenna radome. For ease of retrofitting, an embodiment of the sensor unit receiver as disclosed herein is operably connectable to a slip ring or other power line of a RADAR system to receive corresponding power.

Embodiments of an ice loading sensor unit as disclosed herein include a sensor unit receiver configured to generate a baseband signal based of a signal strength of the received harmonic. In such embodiments, the baseband signal may be comparatively monitored against calibrated thresholds indicative of various thicknesses of ice, corresponding to potential corrective action(s).

In an embodiment, a first threshold may be indicative of a thickness of ice requiring minor electrical compensation to transmit a RADAR signal at a compensated power level that counteracts spectral attenuation from the accumulated ice. In an embodiment, a second threshold may be indicative of a thickness of ice requiring significant electrical compensation to transmit a RADAR signal at a compensated power level that counteracts spectral attenuation from the accumulated ice. In an embodiment, a third threshold may be indicative of a thickness of ice requiring temporary shutdown of the RADAR system. In an embodiment, a fourth threshold may be indicative of a thickness of ice requiring immediate removal of ice from a surface of the RADAR system.

In an embodiment the sensor unit may generate a digital word based on at least one of the baseband signal or the triggered threshold. The sensor unit can provide the digital word to the RADAR signal processor, which can take corrective action based on the digital word. For example, the RADAR signal processor may increase RADAR signal strength when receiving a digital word corresponding to the first or second threshold. Embodiments of the present disclosure include operation of the sensor unit receiver as disclosed herein to monitor environmental conditions and other general purpose RADAR functions.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A sensor unit for use in determining a thickness of ice on a surface of a RADAR system having a RADAR antenna, the sensor unit comprising:
   a sensor unit antenna tunable to a harmonic of a RADAR antenna signal, the harmonic having a frequency within an ice absorption band, wherein the sensor unit antenna emits the harmonic at a first signal strength, and
   a sensor unit receiver communicatively coupled to the sensor unit antenna and configured to detect a second signal strength of the harmonic received by the sensor unit antenna.

2. The sensor unit of claim 1, wherein the sensor unit receiver is configured to generate a baseband signal proportional to the second signal strength of the harmonic.

3. The sensor unit of claim 1, wherein the sensor unit receiver is configured to determine a signal attenuation based on the first signal strength of the harmonic and the second signal strength of the harmonic, for generating a baseband signal proportional to the signal attenuation.

4. The sensor unit of claim 3, wherein the sensor unit receiver generates the baseband signal based on the signal attenuation and an attenuation rate of the ice absorption band.

5. The sensor unit of claim 4, wherein the sensor unit receiver determines the thickness of ice based on comparing the baseband signal to pre-calibrated signal thresholds indicative of the thickness of ice.

6. The sensor unit of claim 1, wherein the sensor unit antenna comprises a parasitic antenna.

7. The sensor unit of claim 1, wherein the sensor unit antenna is tuned to the harmonic falling within the ice absorption band between about 20 GHz and about 30 GHz.

8. The RADAR system of claim 7, wherein the waveguide antenna is a linear waveguide antenna operating in an X-band.

9. The RADAR system of claim 8 wherein the RF frequency is selected from a range between about 9 GHz and about 9.5 GHz.

10. The RADAR system of claim 9, wherein the sensor unit antenna arrays comprises a parasitic array of patch antennas.

11. The RADAR system of claim 7 wherein the sensor unit receiver is a Ka band receiver configured to detect signals between about 26.5 GHz and about 40 GHz.

12. The sensor unit of claim 1, wherein the sensor unit antenna is mountable to at least one of an interior side of a surface of the RADAR system or an exterior side of the surface of the RADAR system wherein the surface of the RADAR system is exposed to ice accumulation.

13. A Radio Detection and Ranging (RADAR) system, comprising:
   a radome;
   a waveguide antenna housed in the radome and configured to operate at an RF frequency;
   a sensor unit antenna array mounted to a surface of the radome exposed to ice accumulation, the sensor unit antenna array being tunable to a harmonic of the RF frequency within an ice absorption band, wherein the sensor unit antenna is configured to emit the harmonic at a first signal strength; and
   a sensor unit receiver housed in the radome and communicatively coupled to the sensor unit antenna, the sensor unit receiver configured to detect a second signal strength of the harmonic.

14. The RADAR system of claim 13, wherein the sensor unit receiver generates a baseband signal proportional to the second signal strength of the harmonic.

15. The RADAR system of claim 13, wherein the sensor unit receiver is configured to determine a signal attenuation based on the first signal strength of the harmonic and the second signal strength of the harmonic, for generating a baseband signal proportional to the signal attenuation.

16. The RADAR system of claim 15, wherein the sensor unit receiver generates the baseband signal based on the signal attenuation and an attenuation rate of the ice absorption band.

17. The RADAR system of claim 13 wherein the ice absorption band is between about 20 GHz and about 30 GHz.

18. The RADAR system of claim 13 wherein the sensor unit antenna array is oriented orthogonal to the waveguide antenna.

19. A method of determining a thickness of ice accumulated on a surface of a RADAR system using a sensor unit coupled to the RADAR system, comprising:
   tuning a sensor unit antenna to a harmonic of a signal transmitted by the RADAR system, the harmonic falling within an ice absorption band;
   emitting the harmonic, from the sensor unit antenna, through the ice, at a first signal strength;
   receiving the harmonic at the sensor unit antenna;
   detecting, using a sensor unit receiver communicatively coupled to the sensor unit antenna, a second signal strength of the harmonic received by the sensor unit antenna;
   determining, using the sensor unit receiver, an attenuation of the harmonic based on the first signal strength and the second signal strength; and
   determining a thickness of the ice based on the attenuation of the harmonic and an attenuation rate of the ice absorption band.

20. The method of claim 19 further comprising outputting a baseband signal proportional to the determined thickness of the ice.

* * * * *